United States Patent
Hosokawa

(10) Patent No.: US 8,281,277 B2
(45) Date of Patent: Oct. 2, 2012

(54) SIGNAL SELECTING APPARATUS, CIRCUIT AMENDING APPARATUS, CIRCUIT SIMULATOR, CIRCUIT EMULATOR, METHOD OF SIGNAL SELECTION AND PROGRAM

(75) Inventor: Kohei Hosokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 836 days.

(21) Appl. No.: 12/311,249

(22) PCT Filed: Sep. 25, 2007

(86) PCT No.: PCT/JP2007/068517
§ 371 (c)(1),
(2), (4) Date: Mar. 24, 2009

(87) PCT Pub. No.: WO2008/038617
PCT Pub. Date: Apr. 3, 2008

(65) Prior Publication Data
US 2010/0198573 A1    Aug. 5, 2010

(30) Foreign Application Priority Data

Sep. 29, 2006 (JP) .................................. 2006-268142

(51) Int. Cl.
*G06F 17/50* (2006.01)
(52) U.S. Cl. ......... 716/136; 716/132; 716/133; 716/134
(58) Field of Classification Search .................. 716/132, 716/133, 134, 136
See application file for complete search history.

(56) References Cited

U.S. PATENT DOCUMENTS

| 4,924,429 A | | 5/1990 | Kurashita et al. |
| 5,323,453 A | * | 6/1994 | Arras et al. ................... 379/322 |
| 6,099,578 A | | 8/2000 | Itoh |
| 6,166,518 A | * | 12/2000 | Echarri et al. ................ 320/106 |
| 7,425,834 B2 | * | 9/2008 | Matthews et al. ............. 324/548 |
| 2004/0019859 A1 | | 1/2004 | Ravi et al. |
| 2004/0123249 A1 | | 6/2004 | Sato et al. |
| 2007/0111687 A1 | * | 5/2007 | Weng et al. ................ 455/127.5 |

FOREIGN PATENT DOCUMENTS

| JP | 64-26243 | 1/1989 |
| JP | 11-67922 | 3/1999 |
| JP | 2001-209797 | 8/2001 |
| JP | 2002-149714 | 5/2002 |
| JP | 2003-197746 | 7/2003 |
| JP | 2004-54756 | 2/2004 |
| JP | 2005-351635 | 12/2005 |

OTHER PUBLICATIONS

D. Drako, et al. "HDL Verification Coverage", Integrated System Design Magazine, pp. 46-52, Jun. 1998).
European Search Report dated Aug. 1, 2012.

* cited by examiner

*Primary Examiner* — Sun Lin
(74) *Attorney, Agent, or Firm* — McGinn IP Law Group, PLLC

(57) ABSTRACT

Signal selecting apparatus 100 according to the present invention for determining an operation parameter of circuit 101 includes circuit analyzing means 110 for enumerating signals in the circuit that are to be measured for the operation parameter when information of the circuit is input thereto, observation signal number determination means 111 for statistically determining the number of observation signals required to determine the operation parameter from the width and reliability of an estimated error and from the number of enumerated signals, and observation signal selecting means 112 for selecting, from the enumerated signals, the same number of signals as the number of observation signals.

31 Claims, 6 Drawing Sheets

```
module top(clk, count, hit);
    input clk;
    output [9999:0] count;
    output hit;
    wire enable;
    reg [9999:0] count;

assign enable = 1'b1;
    assign hit = count == 10000'h12345678;

always @(posedge clk)
        if (enable)
            count <= count + 10000'h1;

endmodule
```

US 8,281,277 B2

SIGNAL SELECTING APPARATUS, CIRCUIT AMENDING APPARATUS, CIRCUIT SIMULATOR, CIRCUIT EMULATOR, METHOD OF SIGNAL SELECTION AND PROGRAM

TECHNICAL FIELD

The present invention relates to the verification of functions of a logic circuit, and more particularly to a signal selecting apparatus, a circuit correcting apparatus, a circuit simulator, a circuit emulator, a signal selecting method, and a program for efficiently measuring an operation parameter of a circuit.

BACKGROUND ART

It is highly important to verify all the functions which a digital LSI circuit has in advance in order to avoid remanufacturing of the digital LSI circuit. It is therefore necessary to enumerate all the functions of the digital LSI circuit and verify each of the functions.

According to the present LSI design approach, however, since a manual process is employed to enumerate all the functions of a digital LSI circuit, it is impossible to prevent some functions from being omitted from the list.

Other than enumerating and verifying all the functions, the present LSI design process also uses other indexes for measuring the goodness of the verification. One of the other indexes is a toggle percentage. One example is disclosed in literature (D. Drako and P. Cohen, "HDL Verification Coverage," Integrated System Design Magazine, pp. 46-52, June 1998).

The toggle percentage refers to the rate of change of signals at the time the circuit operation is finished, and is specifically determined as (L+H)2N where L represents the number of signals which have changed even once from logic 1 to logic 0, N the number of signals which have changed even once from logic 0 to logic 1, and N the number of all signals that are present in the circuit.

To determine a toggle percentage, therefore, it is necessary to have information (changes) of all signals that are present in the LSI circuit. According to the present LSI design approach, the toggle percentage is determined by an RTL simulator.

However, recent digital LSI circuits have been experiencing tremendous multifunctionalization, and the simulating rate has been decreasing steadily. As a result, it has become difficult to determine toggle percentages with RTL simulators. A solution to this problem is a process of determine the toggle percentage by using a hardware simulator. One example of such a hardware simulator is disclosed in JP-A No. 01-026243.

DISCLOSURE OF THE INVENTION

The processes according to the background art require information of all signals in the circuit (information of signal changes) in order to determine the toggle percentage as an operation parameter and to determine a power consumption rate. The need for information of all signals in the circuit results in a reduction in the operating speed of the RTL simulator because it is necessary to detect changes in all the signals and record the detected signal changes.

The hardware simulator and actual digital LSI circuits are problematic in that the scale of circuits required to determine the toggle percentage is large because circuits for detecting signal changes, storage devices for storing the detected signal changes, and means for reading the data from the storage devices are required for all the signals.

The present invention has been made to solve the above problems of the background art. It is an object of the present invention to provide a signal selecting apparatus, a circuit correcting apparatus, a circuit simulator, a circuit emulator, a signal selecting method, and a program for enabling a computer to perform such a method, which do not need information of changes in all signals in a circuit at the time of determining operation parameters of the circuit.

According to the present invention, a signal selecting apparatus for determining an operation parameter of circuit comprises circuit analyzing means for enumerating signals in the circuit that are to be measured for the operation parameter when information of the circuit is input thereto, observation signal number determination means for statistically determining the number of observation signals required to determine the operation parameter from a width and a reliability of an estimated error and from the number of enumerated signals, and observation signal selecting means for selecting, from the enumerated signals, the same number of signals as the number of observation signals.

According to the present invention, the number of signals required to determine the operation parameter is statistically calculated, and hence is smaller than the number of signals required heretofore. Therefore, the operation parameter can be determined more efficiently than heretofore while maintaining reliability for the verification of the functions of the circuit.

According to the present invention, the number of signals required for the operation parameter is statistically calculated, and hence is reduced compared with the number of signals required heretofore. Therefore, a reduction in the speed which will occur if the toggle percentage and the power consumption rate are determined by an RTL simulator is reduced.

Furthermore, for determining the toggle percentage and the power consumption rate of an overall circuit, not all the signals in the circuit, but only randomly extracted sample signals are used. Therefore, the circuit scale for determining the toggle percentage and the power consumption rate by using a hardware simulator or an actual digital LSI circuit may be smaller than heretofore.

Figure 1:
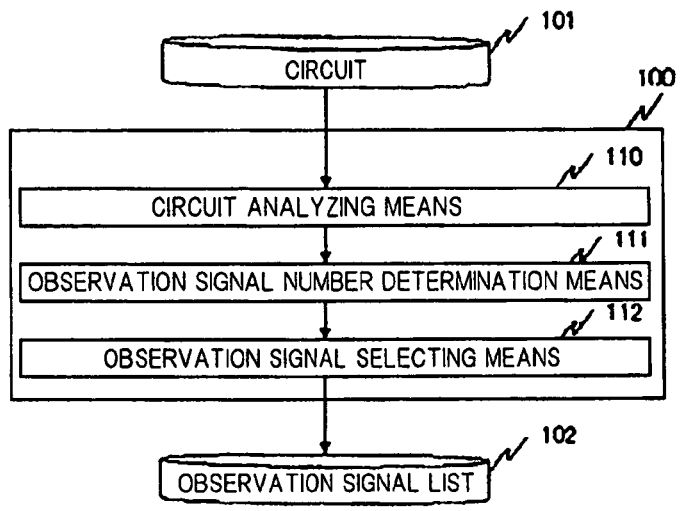
FIG. 1 is a block diagram showing a configurational example of a first exemplary embodiment of the present invention.

DESCRIPTION OF REFERENCE CHARACTERS 100 signal selecting apparatus
101 circuit
102 observation signal list
110 circuit analyzing means
111 observation signal number determination means
112 observation signal selecting means
400 circuit correcting apparatus
401 circuit inserting means
402 corrected circuit
501, 501.1, ..., 501.x observation signal
502, 502.1, ..., 502.x change detecting circuit
503 reading circuit
601, 604, 605 D-type flip-flop
602, 603 signal line
801, 802 counter
901 simulator
902 event holding means
904 observation signal judging means
905 change detecting means
906 storage
907 display means
950 controller
1101 packaging means
1102 hardware simulator
1103 estimating means
1104 display means

BEST MODE FOR CARRYING OUT THE INVENTION

1st Exemplary Embodiment

The configuration of a signal selecting apparatus according to the present exemplary embodiment will be described below. FIG. 1 is a block diagram showing a configurational example of a signal selecting apparatus according to the present exemplary embodiment.

As shown in FIG. 1, when signal selecting apparatus 100 according to the present exemplary embodiment is supplied with circuit information which represents circuit 101 to be measured for a toggle percentage, described by Verilog-HDL (Hardware Description Language) or VHDL, signal selecting apparatus 100 determines observation signal list 102 from the circuit information and outputs observation signal list 102. The circuit information may be stored in advance in a storage device, not shown.

Observation signal list 102 is a list of observation signals which need to be observed for determining an operation parameter of circuit 101. The circuit information stored in storage 101 refers to information representative of circuit 101 which is described by a hardware description language such as Verilog-HDL or VHDL. The circuit information includes information as to the types and number of logic gates in the circuit and information as to how the logic gates are connected. The hardware description language which describes circuit 101 is not limited to Verilog-HDL or VHDL, but may be another hardware description language. The circuit information may alternatively be represented by circuit diagrams.

Signal selecting apparatus 100 comprises circuit analyzing means 110 for enumerating all signals that are present in circuit 101, observation signal number determination means 111 for statistically determining the number of observation signals from the width and reliability of an estimated error and from the number of signals enumerated by circuit analyzing means 110, and observation signal selecting means 112 for randomly selecting the same number of observation signals as the number determined by observation signal number determination means 111, from the signals enumerated by circuit analyzing means 110.

Signal selecting apparatus 100 also includes a CPU (Central Processing Unit) for executing predetermined processes according to programs and a memory for storing the programs. The CPU executes the programs to virtually configure circuit analyzing means 110, observation signal number determination means 111, and observation signal selecting means 112 in signal selecting means 100. Each of the means will be described in detail below.

Circuit analyzing means 110 enumerates all signals that are present in circuit 101, and generates a signal list setting forth information of the signals. According to the present exemplary embodiment, circuit analyzing means 110 enumerates all signals regardless of their characteristics.

Observation signal number determination means 111 determines the number of observation signals according to the equation (1):

$$\frac{N}{\frac{N-1}{0.25}\left(\frac{e/2}{Q^{-1}(1-q)/2}\right)^2 + 1} \quad (1)$$

where e represents the width of an estimated error, q the reliability of the estimated error, and N the number of signals enumerated by circuit analyzing means 110. Function $Q^{-1}((1-q)/2)$ is the inverse function of an upper probability function of a standard normal distribution. The equation (1) is based on the assumption that the probability distribution of a toggle percentage is a normal distribution. The width and reliability of the estimated error may be either input from outside by the operator or registered in advance in storage 101.

If N is 100000, the width of the estimated error is 5% (0.05), and the reliability thereof is 95% (0.95), for example, then based on the definition of the upper probability function of the standard normal distribution, $Q^{-1}((1-0.95)/2)\approx1.96$, and hence the number of observation signals is about 1513. More specifically, if the toggle percentage determined by observing 1513 observation signals is 70%, then it is statistically guaranteed that a true toggle percentage is present in an interval [67.5, 72.5] with a probability of 95%.

Observation signal selecting means 112 randomly selects the same number of observation signals as the number of observation signals that is determined by observation signal number determination means 111, from the signals enumerated by circuit analyzing means 110.

The circuit to be measured for a toggle percentage is not limited to circuit 101 as a whole, but may be a subblock in circuit 101. In this case, the number of subblocks is not limited to one. Circuit analyzing means 110, observation signal number determination means 111, and observation signal selecting means 112 operate as described above with respect to the circuit to be measured. In the present exemplary embodiment, they operate with respect to circuit 101 as a whole.

Figure 2:
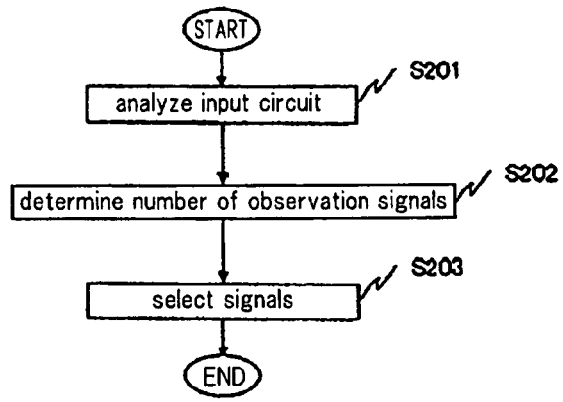
FIG. 2 is a flowchart showing an operational flow of the first exemplary embodiment of the present invention.

Overall operation of the signal selecting apparatus according to the present exemplary embodiment will be described in detail below. FIG. 2 a flowchart showing an operational sequence of the signal selecting apparatus according to the present exemplary embodiment.

When information of circuit 101 is input to signal selecting apparatus 100, circuit analyzing means 110 analyzes signals to be measured for a toggle percentage in circuit 101 and generates a signal list setting forth information of the signals (step S201).

Then, observation signal number determination means 111 determines the number of signals by referring to the signal list generated in step S201. Observation signal number determination means 111 determines, from the width and reliability of the input estimated error, the number of observation signals which is capable of statistically guaranteeing the width and reliability of the estimated error (step S202).

Thereafter, observation signal selecting means 112 randomly selects the same number of observation signals as the number of observation signals that is determined in step S202, from the signal list generated in step S201, and generates observation signal list 102. Then, observation signal selecting means 112 outputs observation signal list 102.

In the present exemplary embodiment, the operation parameter is given as a toggle percentage. However, the operation parameter may be given as a power consumption rate. An information processing apparatus such as a computer or the like which functions as the storage storing the circuit information and signal selecting apparatus 100 may perform a signal selecting method according to the present exemplary embodiment.

Advantages of the present exemplary embodiment will be described below. The signal selecting apparatus and the signal selecting method according to the present exemplary embodiment are capable of dramatically reducing the number of observation signals for determining a toggle percentage as an operation parameter and a power consumption rate, from the number of observation signals required according to the background art. Consequently, the signal selecting apparatus and the signal selecting method according to the present exemplary embodiment can dramatically reduce a reduction in the speed which would occur if a toggle percentage and a power consumption rate were determined by a circuit simulator, while maintaining reliability for the verification of the functions of the circuit.

Furthermore, for determining the toggle percentage and the power consumption rate of an overall circuit, not all the signals in the circuit, but only randomly extracted sample signals are used. Therefore, a system can be provided for determining the toggle percentage in which a hardware simulator or an actual digital LSI circuit, that requires a smaller increase in the amount of area than hitherto, is used.

2nd Exemplary Embodiment

A second exemplary embodiment of the present invention will be described below. Since overall operation of the present exemplary embodiment is the same as with the first exemplary embodiment, details that are different from those of the first exemplary embodiment will mainly be described below.

According to the first exemplary embodiment, observation signal number determination means 111 determines the number of observation signals which is capable of statistically guaranteeing the toggle percentage of circuit 101 no matter what value the toggle percentage may have. According to the present exemplary embodiment, observation signal number determination means 111 determines the number of observation signals which does not guarantee the toggle percentage no matter what value the toggle percentage may have, but which is capable of statistically guaranteeing the toggle percentage only when a true toggle percentage is equal to or greater than a given value.

Specifically, 0.25 in the equation (1) is replaced with a value calculated according to $u(1-u)$ where u represents a true toggle percentage. For example, if the toggle percentage is statistically guaranteed only when the true toggle percentage is 80% or greater, then 0.25 in the equation (1) is replaced with $0.8 \times 0.2 = 0.16$, and if the toggle percentage is statistically guaranteed only when the true toggle percentage is 90% or greater, then 0.25 in the equation (1) is replaced with $0.9 \times 0.1 = 0.09$.

Advantages of the present exemplary embodiment will be described below. The signal selecting apparatus and the signal selecting method according to the present exemplary embodiment can further reduce the number of observation signals compared with the first exemplary embodiment.

If N is 100000, the width of the estimated error is 5% (0.05), and the reliability thereof is 95% (0.95), for example, then the number of observation signals is 1513 according to the first exemplary embodiment. If the toggle percentage is statistically guaranteed only when the true toggle percentage is 80% or greater, then the number of observation signals is 973, and if the toggle percentage is statistically guaranteed only when the true toggle percentage is 90% or greater, then the number of observation signals is 550. Therefore, the number of observation signals is reduced by 36% and 64%, respectively.

3rd Exemplary Embodiment

A third exemplary embodiment of the present invention will be described below. Since overall operation of the present exemplary embodiment is the same as with the first exemplary embodiment, details that are different from those of the first exemplary embodiment will mainly be described below.

The third exemplary embodiment is different from the first exemplary embodiment as to operation of circuit analyzing means 110. Circuit analyzing means 110 according to the present exemplary embodiment does not output a signal which it has recognized as "unchanged" to the signal list received from circuit analyzing means 110. The signal which is "unchanged" means that the potential of a signal line does not change in the operation of circuit 101.

Signals which are recognized as "unchanged" by circuit analyzing means 110 include a signal of fixed value which is connected to a power supply or ground, or a spare output signal. These signals may be designated in advance by the user operating signal selecting apparatus 100 or may be judged by circuit analyzing means 110 according to a recognizing process described in advance in a program. Furthermore, since there are circuit blocks that do not absolutely operate depending on a test vector to be executed, they are analyzed and will not be output to the signal list.

Advantages of the present exemplary embodiment will be described below. The signal selecting apparatus and the signal selecting method according to the present exemplary embodiment make it possible to delete, in advance, factors for involuntarily lowering a toggle percentage, compared with the first exemplary embodiment.

4th Exemplary Embodiment

A fourth exemplary embodiment of the present invention will be described below. The present exemplary embodiment has the same object as the third exemplary embodiment, but is different from the third exemplary embodiment as follows: According to the third exemplary embodiment, circuit analyzing means 110 does not output a signal which it has recognized as "unchanged" to the signal list. According to the present exemplary embodiment, observation signal selecting means 112 operates so as not to select a signal which it has recognized as "unchanged". A process for causing observation signal selecting means 112 to recognize a given signal may be designated in advance by signal selecting apparatus 100 operated by the user or may be described in advance in a program.

Overall operation of the present exemplary embodiment is the same as the first exemplary embodiment, and will not be described in detail below. Advantages of the present exemplary embodiment are the same as the third exemplary embodiment, and will not be described in detail below.

5th Exemplary Embodiment

A fifth exemplary embodiment of the present invention will be described below. Since overall operation of the present exemplary embodiment is the same as with the first exemplary embodiment, details that are different from those of the first exemplary embodiment will mainly be described below.

The fifth exemplary embodiment is different from the first exemplary embodiment as to operation of circuit analyzing means 110. Circuit analyzing means 110 according to the present exemplary embodiment does not output a signal which it has recognized as "changed" to the signal list received from circuit analyzing means 110. The signal which is "changed" means that the potential of a signal line changes, i.e., the value signified by the potential changes from 1 to 0 or 0 to 1, in the operation of circuit 101.

Signals which are recognized as "unchanged" by circuit analyzing means 110 include a clock signal, a reset signal, and signals at the input and output terminals of circuit 101. These signals may be designated in advance by signal selecting apparatus 100 operated by the user or may be judged by circuit analyzing means 110 according to a recognizing process described in advance in a program.

Advantages of the present exemplary embodiment will be described below. The signal selecting apparatus and the signal selecting method according to the present exemplary embodiment make it possible to delete, in advance, factors for involuntarily increasing a toggle percentage, compared with the first exemplary embodiment.

6th Exemplary Embodiment

A sixth exemplary embodiment of the present invention will be described below. The present exemplary embodiment has the same object as the fifth exemplary embodiment, but is different from the fifth exemplary embodiment as follows: According to the fifth exemplary embodiment, circuit analyzing means 110 does not output a signal which it has recognized as "changed" to the signal list. According to the present exemplary embodiment, observation signal selecting means 112 operates so as not to select a signal which it has recognized as "changed". A process for causing observation signal selecting means 112 to recognize a given signal may be designated in advance by the user operating signal selecting apparatus 100 or may be described in advance in a program.

Overall operation of the present exemplary embodiment is the same as the first exemplary embodiment, and will not be described in detail below. Advantages of the present exemplary embodiment are the same as the fifth exemplary embodiment, and will not be described in detail below.

7th Exemplary Embodiment

A seventh exemplary embodiment of the present invention will be described below. Since overall operation of the present exemplary embodiment is the same as with the first exemplary embodiment, details that are different from those of the first exemplary embodiment will mainly be described below.

The seventh exemplary embodiment is different from the first exemplary embodiment as to operation of circuit analyzing means 110 and observation signal selecting means 112. Circuit analyzing means 110 according to the present exemplary embodiment analyzes the dependency relationship between signals and outputs the dependency relationship, in addition to performing the operation described with respect to the first exemplary embodiment. Observation signal selecting means 112 selects signals between which there is no dependency relationship.

The dependency relationship refers to, for example, the relationship between signals A, B, connected by an inverter, in a circuit that is to be measured for a toggle percentage. If signal A changes, then signal B necessarily changes. Therefore, if the toggle percentage is low because of no dependency relationship, then the toggle percentage becomes lower, and if the toggle percentage is high because of no dependency relationship, then the toggle percentage becomes higher. Therefore, the dependency relationship is responsible for changing the toggle percentage in a manner to accent itself.

Another example of the dependency relationship is as follows: When the value of signal A changes, any signal whose value can change due to the change in the value of signal A is regarded as having a dependency relationship to signal A, and other signals are regarded as having no dependency relationship to signal A.

Still another example of the dependency relationship is as follows: There is a dependency relationship between signals which belong to the same layer of the circuit, and there is no dependency relationship between signals which belong to other layers of the circuit.

Advantages of the present exemplary embodiment will be described below. The operation described above in the present exemplary embodiment works to lower the toggle percentage (reduce function verification omissions), though the operation is not permitted statistically. Therefore, the probability that the value of the toggle percentage will be higher than actual value can be reduced.

8th Exemplary Embodiment

An eighth exemplary embodiment of the present invention will be described below. Since overall operation of the present exemplary embodiment is the same as with the first exemplary embodiment, details that are different from those of the first exemplary embodiment will mainly be described below.

The eighth exemplary embodiment is different from the first exemplary embodiment as to operation of circuit analyzing means 110, observation signal number determination means 111, and observation signal selecting means 112, and in that circuit 101 is divided into a plurality of subblocks.

Circuit analyzing means 110 analyzes the circuit in each designated subblock and outputs a signal list of signals in the circuit in each designated subblock.

Observation signal number determination means 111 determines the number of observation signals per designated subblock from the width and reliability of an estimated error in each designated subblock and the number of signals analyzed by circuit analyzing means 110.

Observation signal selecting means 112 selects the same number of observation signals as the number of observation signals that is determined by observation signal number determination means 111, in each designated subblock, from the signal list output in each designated subblock by circuit analyzing means 110.

Advantages of the present exemplary embodiment will be described below. The present exemplary embodiment is capable of determining a toggle percentage that can statistically be guaranteed in each designated subblock. The present exemplary embodiment can thus determine a plurality of toggle percentages together in one operation, and can reduce the time required to measure the toggle percentages.

9th Exemplary Embodiment

A ninth exemplary embodiment of the present invention will be described below. Since overall operation of the present exemplary embodiment is the same as with the eighth exemplary embodiment, details that are different from those of the eighth exemplary embodiment will mainly be described below.

Figure 3:
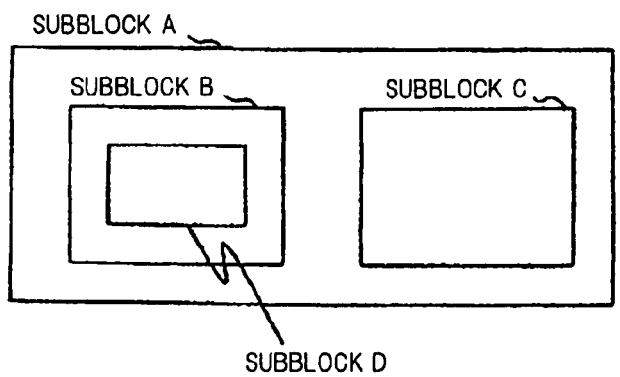
FIG. 3 is a block diagram of a circuit illustrative of a ninth exemplary embodiment of the present invention.

The ninth exemplary embodiment is different from the eighth exemplary embodiment in that operation of observation signal number determination means 111 and a designated subblock are in an inclusion relationship. FIG. 3 is a block diagram of a subblock illustrative of the present exemplary embodiment. In FIG. 3, subblock A includes subblock B and subblock C therein, and subblock B includes subblock D therein. It is assumed that designated subblocks are subblock A and subblock D.

Observation signal number determination means 111 initially determines provisionally statistically the number of observation signals in each designated subblock from the width and reliability of an estimated error in each designated subblock and the number of enumerated signals, according to the same process as in the eighth exemplary embodiment. Then, observation signal number determination means 111 determines the number of observation signals in a subblock by subtracting the provisional number of observation signals in one or more designated subblocks included in the subblock, from the provisionally determined number of observation signals.

A specific example of an operation will be described below with reference to FIG. 3. If subblock D requires 100 provisional observation signals and subblock A requires 300 provisional observation signals, then observation signal number determination means 111 according to the present exemplary embodiment determines the number of observation signals in subblock D as 100, and determines the number of observation signals in subblock A as 300−100=200.

Advantages of the present exemplary embodiment will be described below. The signal selecting apparatus and the signal selecting method according to the present exemplary embodiment are capable of reducing the number of observation signals required to measure a toggle percentage while statistically guaranteeing the value of the number even if designated subblocks overlap each other.

10th Exemplary Embodiment

A tenth exemplary embodiment of the present invention will be described below in detail with reference to the drawings. The present exemplary embodiment pertains to a circuit correcting apparatus for inserting a configuration for detecting a change in observation signals into circuit 101.

Figure 4:
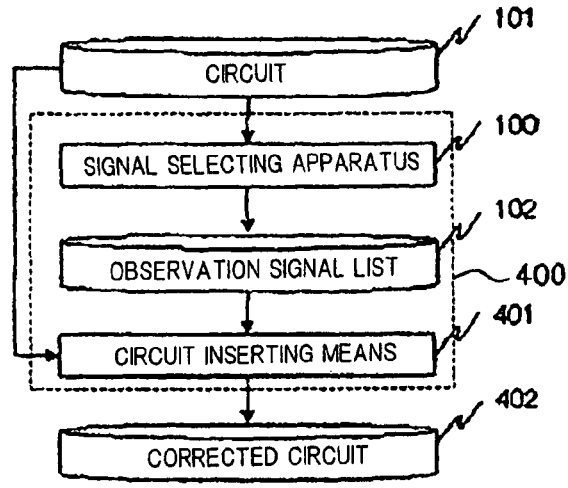
FIG. 4 is a block diagram showing a configurational example of a tenth exemplary embodiment of the present invention.
Figure 5:
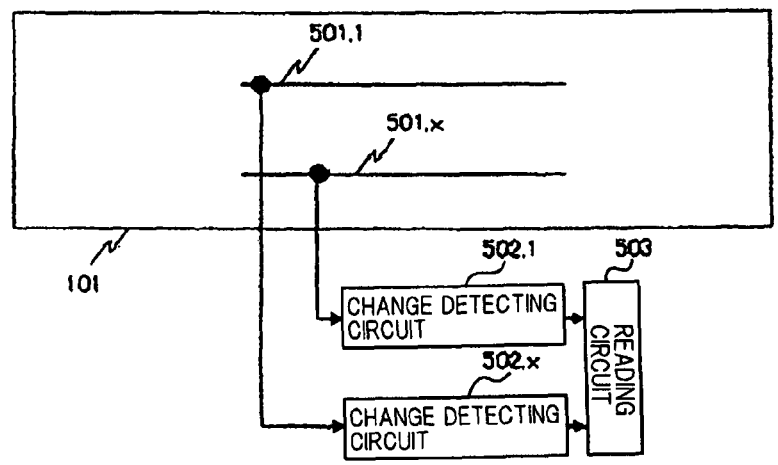
FIG. 5 is a circuit diagram showing an example of a circuit corrected by a circuit inserting means according to the tenth exemplary embodiment of the present invention.

FIG. 4 is a block diagram showing a configurational example of the circuit correcting apparatus according to the present exemplary embodiment, and FIG. 5 is a circuit diagram showing an example of a circuit corrected by the circuit inserting means according to the present exemplary embodiment.

As shown in FIG. 4, circuit correcting apparatus 400 according to the present exemplary embodiment comprises signal selecting apparatus 100 for outputting observation signal list 102 when it is supplied with circuit information which represents circuit 101 to be measured for a toggle percentage, and circuit inserting means 401 for correcting circuit 101 by referring to observation signal list 102. A CPU, not shown, executes a program to virtually configure circuit inserting means 401 in the circuit correcting apparatus.

Circuit inserting means 401 inserts change detecting circuits 502.1, . . . , 502.$x$ for detecting changes in observation signals 501.1, . . . , 501.$x$ in observation signal list 102 and reading circuit 503 for reading whether there are changes detected by change detecting circuits 502.1, . . . , 502.$x$, into circuit 101, and outputs corrected circuit 402 which has been corrected by the insertion. "$x$" represents any arbitrary integer of 1 or greater.

Signal selecting apparatus 100, circuit 101, and observation signal list 102 are identical to those according to either one of the first through ninth exemplary embodiments, and will not be described in detail below. Operation of circuit inserting means 401 may be carried out by the CPU in signal selecting apparatus 100. A storage device which stores the information of circuit 101 may be provided.

Circuit inserting means 401 will be described in detail with reference to FIG. 5.

Circuit inserting means 401 generates the circuit shown in FIG. 5 which includes change detecting circuits 502.1, . . . , 502.$x$ for respective observation signals 501.1, . . . , 501.$x$ in observation signal list 102 and reading circuit 503, that are added to circuit 101.

In the circuit shown in FIG. 5, change detecting circuits 502.1, . . . , 502.$x$ and reading circuit 503 are added as external circuits to circuit 101 in order not to alter the functional operation of circuit 101. Actually, however, change detecting circuits 502.1, . . . , 502.$x$ may be inserted near the observation signals. Specifically, circuit inserting means 401 connects observation signals 501.1, . . . , 501.$x$ to change detecting circuits 502.1, . . . , 502.$x$ and connects change detecting circuits 502.1, . . . , 502.$x$ to reading circuit 503 without altering the functional operation of circuit 101.

Figure 6:
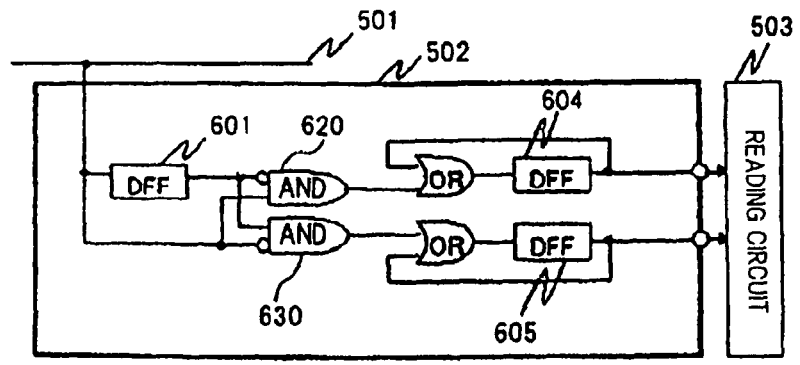
FIG. 6 is a block diagram showing a configurational example of a change detecting circuit according to the tenth exemplary embodiment of the present invention.

$x$ change detecting circuits 502.1, . . . , 502.$x$ are functionally identical to each other. A specific example of change detecting circuits 502.1, . . . , 502.$x$ will be described below. FIG. 6 is a block diagram showing a configurational example of the change detecting circuit according to the present exemplary embodiment. In FIG. 6, observation signals 501.1, . . . , 501.$x$ are representatively denoted by 501, and change detecting circuits 502.1, . . . , 502.$x$ are representatively denoted by 502.

As shown in FIG. 6, change detecting circuits 502.1, ..., 502.x comprise DFF (D-type flip-flop) 601 for outputting a value of observation signal 501 in a preceding cycle, AND gate 620 for producing output signal 1 when the value of observation signal 501 is 1 and the value thereof in the preceding cycle is 0, AND gate 630 for producing output signal 1 when the value of observation signal 501 is 0 and the value thereof in the preceding cycle is 1, DFF 604 for storing value 1 when observation signal 501 changes from 0 to 1 even once, and DFF 605 for storing value 1 when observation signal 501 changes from 1 to 0 even once.

In order to detect changes in observation signal 501 other than jitter, i.e., signal fluctuations during the propagation of logic levels, the fastest clock signal for all flip-flops for latching observation signal 501 and data signals that logically depend thereon is used as clock signal for DFF 601, DFF 604, and DFF 605.

The configurational example shown in FIG. 6 employs D-type flip-flops as means for storing values. However, any other means for storing values may be employed.

DFF 604 and DFF 605 may be supplied with reset signals and clock enable signals for measuring a toggle percentage only during a required test period.

Reading circuit 503 serves as a means for reading the values stored in DFFs 604 and DFFs 605 in x change detecting circuits 502.1, ..., 502.x. The reading circuit in the circuit correcting apparatus according to the present exemplary embodiment is not limited to the configuration in the present exemplary embodiment, but may be of any circuit configuration insofar as it can read the values of all DFFs 604 and DFFs 605. For example, the reading circuit may be a serial-connected circuit to enable reduced circuit scale or a parallel-connected circuit for reading a plurality of values parallel to each other to enable reduced reading time.

Figure 7:
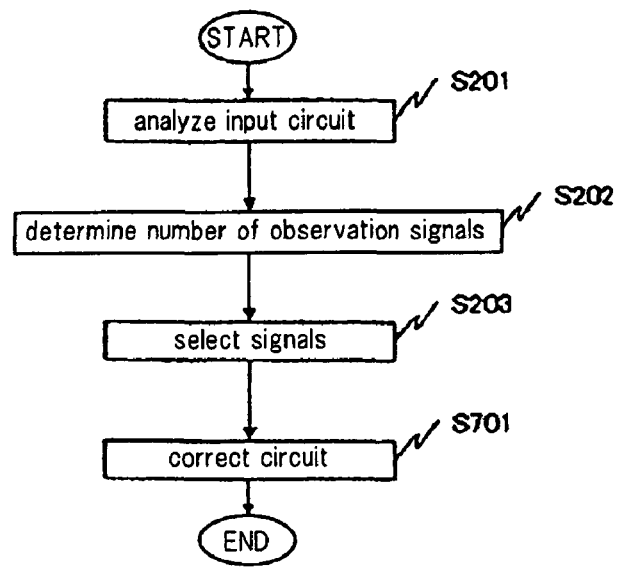
FIG. 7 is a flowchart showing an operational flow of the tenth exemplary embodiment of the present invention.

Overall operation of the circuit correcting apparatus according to the present exemplary embodiment will be described in detail below. FIG. 7 is a flowchart showing an operation sequence of the circuit correcting apparatus according to the present exemplary embodiment.

The operation of the circuit correcting apparatus according to the present exemplary embodiment is the same as the operation sequence shown in FIG. 2 which has been described in the second exemplary embodiment with the addition of the processing of step S701. In step S701, circuit inserting means 401 inserts change detecting circuits 502.1, ..., 502.x and reading circuit 305 into circuit 101, thereby correcting circuit 101.

Advantages of the present exemplary embodiment will be described below. The circuit correcting apparatus according to the present exemplary embodiment can eliminate the work of adding change detecting circuits to respective observation signals, whose number may be several tens of thousands depending on the width and reliability of an estimated error, and of connecting the change detecting circuits to the reading means. Furthermore, since the circuit is automatically corrected, manual correction mistakes are prevented from occurring.

Reset signals or clock enable signals may be applied to DFFs 604 and DFFs 605 of the change detecting circuit to provide a means for determining whether changes are to be detected or not. In such a case, a toggle percentage can be measured only during the required test period.

Writing means may further be added to DFFs 604 and DFFs 605 of the change detecting circuit for easily merging the results that are produced when a plurality of test benches are performed.

11th Exemplary Embodiment

An eleventh exemplary embodiment of the present invention will be described below in detail with reference to the drawings.

Figure 8:
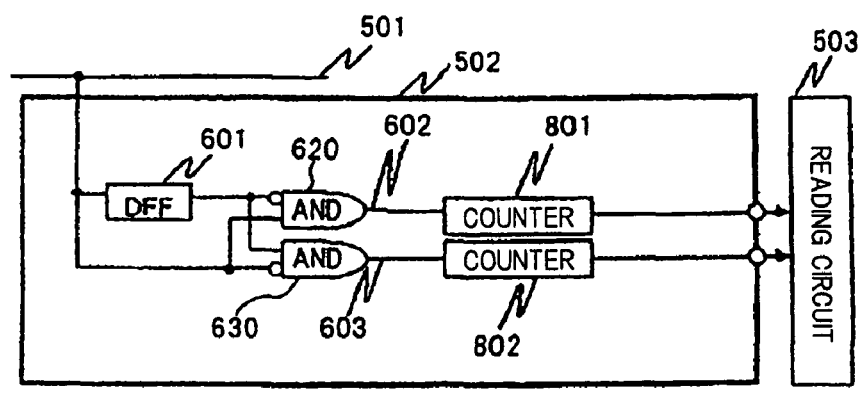
FIG. 8 is a block diagram showing a configurational example of a change detecting circuit according to an eleventh exemplary embodiment of the present invention.

A change detecting circuit according to the present exemplary embodiment is capable of not only detecting whether observation signals are changed or not as with change detecting circuit 502 according to the tenth exemplary embodiment, but also storing the number of times that observation signals are changed. A reading means according to the present exemplary embodiment reads the number of times that observation signals are changed. Since overall operation of the present exemplary embodiment is the same as in the tenth exemplary embodiment, details that are different from those of the tenth exemplary embodiment will mainly be described below.

x change detecting circuits 502.1, ..., 502.x according to the present exemplary embodiment are functionally identical to each other. A specific example of change detecting circuits 502.1, ..., 502.x will be described below. FIG. 8 is a block diagram showing a configurational example of the change detecting circuit according to the present exemplary embodiment. In FIG. 8, observation signals 501.1, ..., 501.x are representatively denoted by 501, and change detecting circuits 502.1, ..., 502.x are representatively denoted by 502.

Change detecting circuits 502.1, ..., 502.x include counter 801 for counting the number of times that the value of a signal on signal line 602 becomes 1, and that replaces DFF 604 according to the tenth exemplary embodiment, and counter 802 for counting the number of times that the value of a signal on signal line 603 becomes 1, and that replaces DFF 605 according to the tenth exemplary embodiment.

In order to detect changes in observation signal 601 other than jitter, i.e., signal fluctuations during the propagation of logic levels, the fastest clock signal for all flip-flops for latching observation signal 501 and data signals that logically depend thereon is used as clock signal for counters 801, 802.

A configuration for inputting reset signals or clock enable signals to counters 801, 802 may be added as a means for determining whether or not changes are to be detected in order to measure the toggle percentage and power consumption ratio only during a required test period.

Reading circuit 503 serves as a means for reading the values of counters 801, 802 in x change detecting circuits 502.1, ..., 502.x. The reading circuit in the circuit correcting apparatus according to the present exemplary embodiment may be of any circuit configuration insofar as it can read the values of all counters 801, 802. For example, the reading circuit may be a serial-connected circuit to enable reduced circuit scale or a parallel-connected circuit for reading a plurality of values parallel to each other to enable reduced reading time.

Advantages of the present exemplary embodiment will be described below. The circuit correcting apparatus according to the present exemplary embodiment can estimate the power consumption rate in the same manner as the toggle percentage based on the number of times that observation signals are changed.

12th Exemplary Embodiment

A twelfth exemplary embodiment of the present invention will be described below in detail with reference to the drawings. The present exemplary embodiment pertains to a circuit simulator which operates under a processor.

Figure 9:
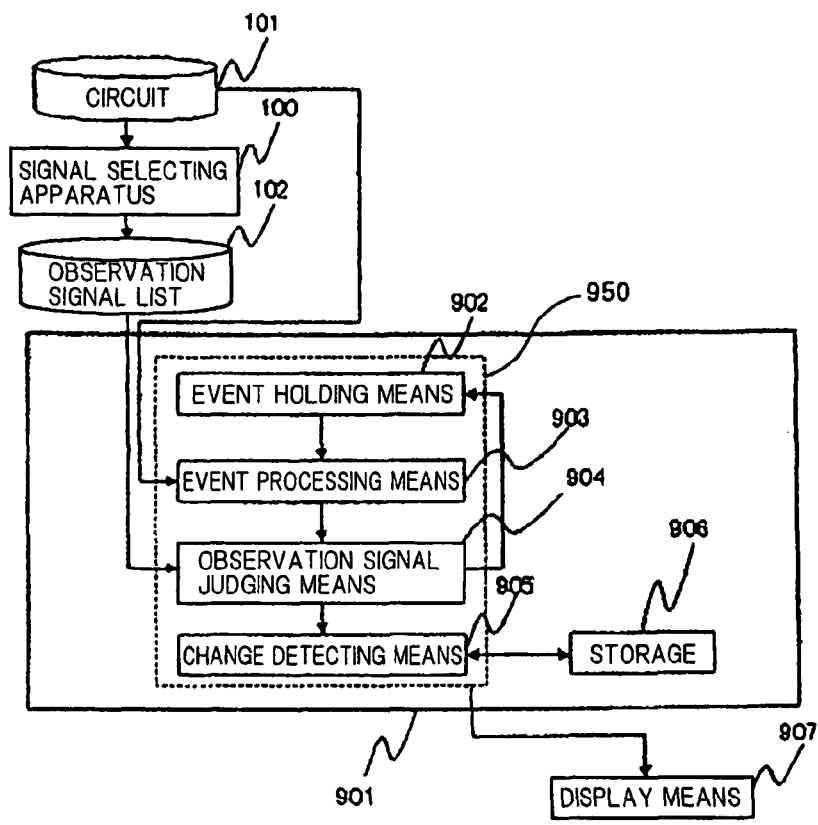
FIG. 9 is a block diagram showing a configurational example of a twelfth exemplary embodiment of the present invention.

FIG. 9 is a block diagram showing a configurational example of the simulator according to the present exemplary embodiment.

Simulator 901 according to the present exemplary embodiment comprises storage 906 and controller 950. Controller 950 is connected to display means 907 for outputting results and to signal selecting apparatus 100 described in the first exemplary embodiment through respective signal lines. Circuit 101, signal selecting apparatus 100, and observation signal list 102 are identical to those according to any one of the first through ninth exemplary embodiments, and will not be described in detail below.

Storage 906 serves as a means for storing the history of changes in all observation signals which are caused by way of simulations. Storage 906 stores a value indicative of whether each observation signal has changed from information 0 to 1 and a value indicative of whether each observation signal has changed from information 1 to 0.

Controller 950 comprises event holding means 902, event processing means 903, observation signal judging means 904, and change detecting means 905.

Controller 950 also has a CPU for performing given processing sequences according to programs and a memory for storing the programs. The CPU executes the programs to virtually configure event holding means 902, event processing means 903, observation signal judging means 904, and change detecting means 905 in simulator 901. Event holding means 902 corresponds to a memory for storing data.

Simulator 901 provides a general event-driven circuit simulator (RTL simulator) based on event holding means 902 and event processing means 903. Operation of the general event-driven circuit simulator will briefly be described below. Event processing means 903 causes an event in the form of a change in a signal and calculates the value of a logic level connected to the signal. When a further event is caused by the calculated value, event holding means 902 registers therein information of the caused event. Event processing means 903 calculates the value of a logic level with respect to the caused event. The above process is repeated to simulate a circuit.

According to the present exemplary embodiment, observation signal judging means 904 and change detecting means 905 are added to controller 950 which includes the above general event-driven logic simulator, with storage 906 also being added.

When observation signal judging means 904 receives observation signal list 102 from signal selecting apparatus 100, observation signal judging means 904 stores observation signal list 102 in storage 906, and determines whether or not a signal with respect to an event processed by event processing means 903 is present in observation signal list 102. If the signal is not present in observation signal list 102, then observation signal judging means 904 determines whether or not a new event processed by event processing means 903 is caused. If an event is caused, then observation signal judging means 904 stores its information in event holding means 902.

If a change in the signal with respect to the event is present in observation signal list 102, then observation signal judging means 904 sends observation signal information including information about the name of the signal, the present time, and the prevent value to change detecting means 905. If a new event processed by event processing means 903 is caused, then observation signal judging means 904 registers information of the event in even holding means 902.

When change detecting means 905 receives the observation signal information from observation signal judging means 904, change detecting means 905 reads the unprocessed value of the observation signal which is currently processed by event processing means 903 from storage 906. If the unprocessed value is different from the present value of the observation signal, then change detecting means 905 stores the change in storage 906. For example, if an observation value has an unprocessed value of 0 and a presently processed value of 1, then change detecting means 905 sets a value indicative of whether the observation signal has changed from 0 to 1 to a value indicative of "changed" in the history of the observation signal in storage 906, and stores the value indicative of "changed" in storage 906.

Controller 950 reads from storage 906 a value indicative of whether each observation signal has changed from information 0 to 1 and a value indicative of whether each observation signal has changed from information 1 to 0, with respect to all the observation signals. Controller 950 then calculates a toggle percentage and controls display means 907 to display the calculated toggle percentage. At this time, controller 950 operates as estimating means for estimating the overall toggle percentage of the circuit based on the detected changes.

In the present exemplary embodiment, the event-driven simulator has been described above. However, a simulator of another type may be employed. The information of events registered by event holding means 902 may be stored in storage 906.

Figure 10:
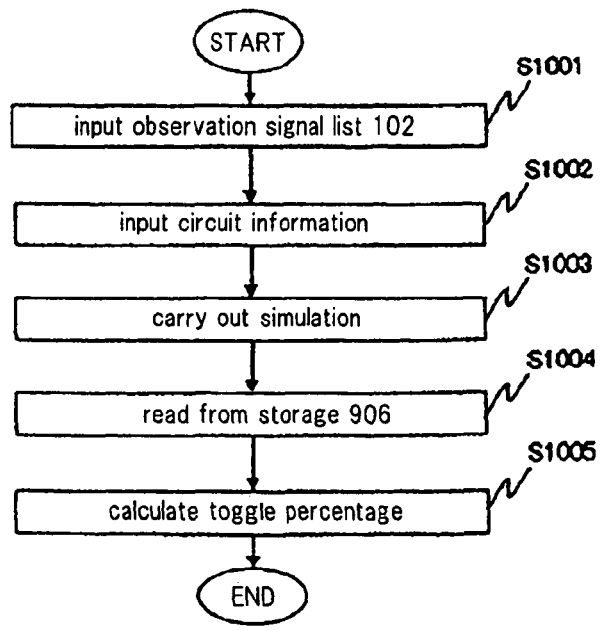
FIG. 10 is a flowchart showing an operational flow of the twelfth exemplary embodiment of the present invention.

An operation sequence of simulator 901 according to the present exemplary embodiment will be described below. FIG. 10 is a flowchart of an operation sequence of the simulator according to the present exemplary embodiment.

When an observation signal list is generated by signal selecting apparatus 100 according to any one of the first through ninth exemplary embodiments, observation signal list 102 is input to simulator 901 (step S1001). When information of circuit 101 is input to simulator 901 (step S1002), simulator 901 carries out a simulation (step S1003). In step S1003, simulator 901 operates in the same manner as a general logic simulator. In this step, according to the present exemplary embodiment, observation signal judging means 904 determines whether or not a change in a signal in each event is present in observation signal list 102. If the event represents a signal present in observation signal list 102, then change detecting means 905 records a change in the signal in storage means 906.

When the simulation is finished, controller 950 reads from storage 906 a value indicative of whether each observation signal has changed from information 0 to 1 and a value indicative of whether each observation signal has changed from information 1 to 0, with respect to all the observation signals (step S1004). Then, controller 950 calculates a toggle percentage from the values read in step S1004 (step S1005), and controls display means 907 to display the calculated toggle percentage.

Advantages of the present exemplary embodiment will be described below. As described with respect to the first exemplary embodiment, the circuit simulator according to the present exemplary embodiment is capable of dramatically reducing the number of signals observed by the simulator for measuring a toggle percentage, compared with general simulators because the general simulators detect changes in all signals. The circuit simulator according to the present invention can dispense with many processing sequences and can operate at a high speed.

Change detecting means 905 may record the number of times that each observation signal has changed from information 0 to 1 and from information 1 to 0 in storage 906, and controller 950 may calculate the overall power consumption rate of the circuit from the recorded number of times. In this case, the recorded information can be used to estimate the power consumption rate.

13th Exemplary Embodiment

A thirteenth exemplary embodiment of the present invention will be described below in detail with reference to the drawings. The present exemplary embodiment pertains to an apparatus for measuring a toggle percentage and a power consumption rate by using a hardware emulator.

Figure 11:
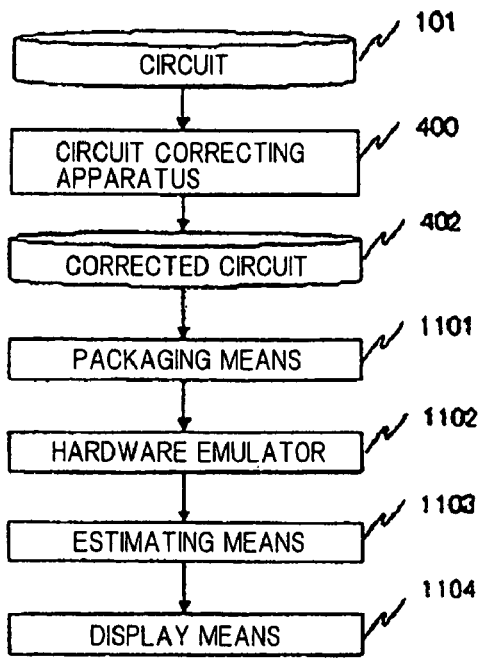
FIG. 11 is a block diagram showing a configurational example of a thirteenth exemplary embodiment of the present invention.

FIG. 11 is a block diagram showing a configurational example of a circuit emulator according to the present exemplary embodiment.

As shown in FIG. 11, hardware emulator 1102 which corresponds to the circuit emulator according to the present exemplary embodiment is connected to circuit correcting means 400 by packaging means 1101. Display means 1104, that is used to output results produced after the emulator has operated, through estimating means 1103, is connected to hardware simulator 1102.

Circuit correcting means 400 according to the present exemplary embodiment is identical to the circuit correcting means according to either the tenth exemplary embodiment or the eleventh exemplary embodiment, and hence will not be described in detail below.

When packaging means 1101 receives a corrected circuit from circuit correcting means 400, packaging means 1101 installs the data in hardware emulator 1102. If hardware emulator 1102 is an FPGA (Field Programmable Gate Array), then packaging means 1101 comprises a synthesis tool for generating a net list from corrected circuit 402 which is described according to HDL or VHDL, and a tool for packaging the generated net list in the FPGA.

Hardware emulator 1102 comprises an emulator means having a function as a general hardware emulator and estimating means 1103. In FIG. 11, estimating means 1103 is shown as being separate. The emulator means emulates the operation of corrected circuit 402, and estimating means 1103 reads the number of changed signals from a reading circuit in corrected circuit 402. Estimating means 1103 calculates the overall toggle percentage of the circuit from the number of changed signals, and sends the calculated toggle percentage to display means 1104. If estimating means 1103 reads the number of times that signals have changed, then estimating means 1103 calculates the overall power consumption rate of the circuit from the number of times, and sends the calculated overall power consumption rate to display means 1104.

Display means 1104 displays the toggle percentage or the power consumption rate calculated by estimating means 1103.

Figure 12:
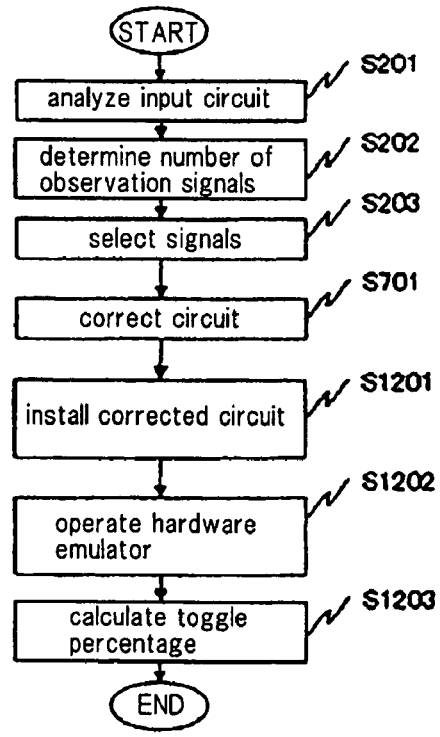
FIG. 12 is a flowchart showing an operational flow of the thirteenth exemplary embodiment of the present invention.

An operation sequence of the hardware emulator for calculating a toggle percentage from circuit 402 corrected by the circuit correcting apparatus will be described below. FIG. 12 is a flowchart of the operation sequence.

Steps S201 through S701 for generating corrected circuit 402 are identical to those described in the tenth exemplary embodiment, and will not be described in detail below. When packaging means 1101 receives corrected circuit 402, it installs the data in hardware emulator 1102 (step S1201).

Then, hardware emulator 1102 emulates corrected circuit 402 (step S1202). During the operation of hardware emulator 1102, change detecting circuits 502.1, . . . , 502.x (see FIG. 5) in corrected circuit 402 detect whether the values of observation signals 501.1, . . . , 501.x have changed.

When the operation of the emulator is finished, estimating means 1103 reads changes detected by change detecting circuits 502.1, . . . , 502.x through reading circuit 503, and calculates a toggle percentage (step S1203). Estimating means 1103 controls display means 1104 to display the calculated toggle percentage. A specific example will be described below.

For example, if 40 out of 100 signals have changed even once from information 0 to 1 and if 60 signals have changed even once from information 1 to 0 while hardware simulator 1102 is operating, then a toggle percentage is calculated as (40+60)/(2*100)=0.5. Display means 1104 displays 50%.

The configuration including packaging means 1101, estimating means 1103, and display means 1104 may be replaced with an information processing apparatus such as a personal computer, a workstation, or the like. In this case, the CPU executes programs to virtually configure packaging means 1101 and estimating means 1103 in the information processing apparatus.

Advantages of the present exemplary embodiment will be described below. As described with respect to the first exemplary embodiment, the circuit emulator according to the present exemplary embodiment is capable of dramatically reducing the number of signals observed by the hardware emulator for measuring a toggle percentage, compared with general hardware emulators because the general hardware emulators detect changes in all signals. The circuit emulator according to the present invention can dispense with many processing sequences and reduce the size of the packaging area on the hardware emulator.

14th Exemplary Embodiment

According to a fourteenth exemplary embodiment of the present invention, the overall toggle percentage at the time when a plurality of test benches is performed can be measured when the test benches are performed on circuit 101 by the hardware emulator. The configurational blocks according to the present exemplary embodiment are identical to those of the thirteenth exemplary embodiment, with only overall operation according to the present exemplary embodiment being different.

To achieve the same object, a plurality of test benches may be combined into one test bench, and the toggle percentage may be measured according to the thirteenth exemplary embodiment. Alternatively, a means may be provided for rewriting the values of change detecting circuits 502.1, . . . , 502.x, and before a next test bench is performed, the values produced as a result of a preceding test bench may be written in DFFs 605, 606, after which the hardware emulator may be repeatedly operated. The same holds true for the simulator.

Figures 13, 14:
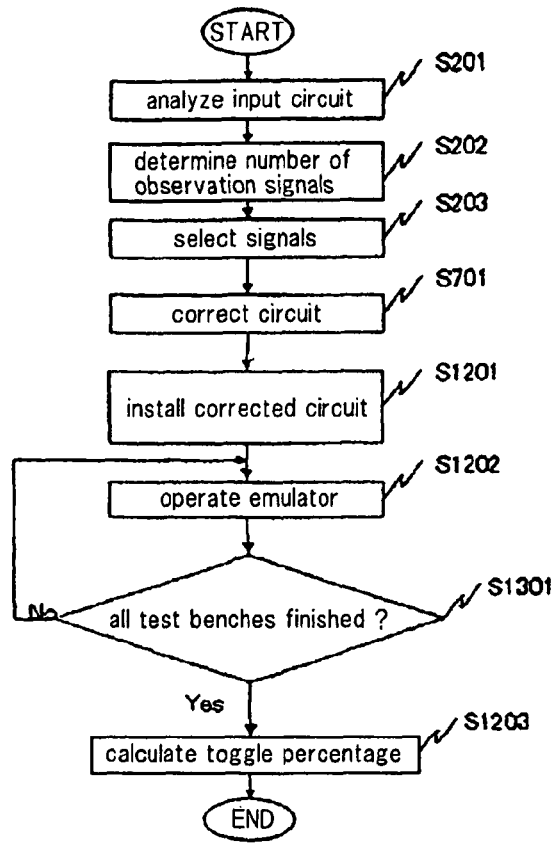
FIG. 13 is a flowchart showing an operational flow of a fourteenth exemplary embodiment of the present invention.
FIG. 14 is a diagram showing an example which is descriptive of a circuit that illustrates Example 1.

Overall operation of the present exemplary embodiment will be described below. FIG. 13 is a flowchart of the operation sequence according to the present exemplary embodiment.

Step S1301 will be described below, since the processes except for step S1301 are identical to the details in the thirteenth exemplary embodiment. In step S1301, hardware emulator 1102 determines whether or not there are test benches not yet finished each time a test bench is finished. The operation of the emulator is repeatedly carried out until all test benches are finished. When all test benches are finished, estimating means 1103 calculates the toggle percentage and controls display means 1104 to display the calculated toggle percentage, as in the thirteenth exemplary embodiment.

Advantages of the present exemplary embodiment will be described below. According to the ordinary digital LSI designing process, it is often customary to accomplish a toggle percentage whose value is close to 100%, using a plurality of test benches. According to the twelfth exemplary embodiment and the thirteenth exemplary embodiment, since it is assumed that there is a single test bench, it is difficult to combine the results of a plurality of test benches. According to the present exemplary embodiment, however, because the results of a plurality of test benches are integrated and displayed, a plurality of test benches may be employed.

Example 1

A specific example of the operation of the first exemplary embodiment wherein circuit 101 is described by Verilog-HDL will be described below. FIG. 14 is a diagram showing an example of a circuit described by Verilog-HDL.

In step S201 shown in FIG. 2, circuit analyzing means 110 analyzes an input circuit (FIG. 14). In the example, circuit analyzing means 110 analyzes the input circuit to find signals clk, count [9999:0], hit, enable.

In next step S202, observation signal number determination means 111 statistically determines the number of observation signals from the width and reliability of the input estimated error and from the number of signals present in the circuit. For example, if the width of the estimated error is 10% and the reliability thereof is 95%, then since the number of signals present in the circuit is 10003, the number of observation signals is about 370. This means that when 370 signals are randomly extracted and a toggle percentage of 0.33 (33%) is obtained therefrom, a true toggle percentage u is present in the range of $0.2 \leq u \leq 0.38$ with a probability of 95%.

In final step S203, observation signal selecting means 112 randomly extracts 370 signals from the circuit and generates observation signal list 102 which is descriptive of the signals.

The present invention is not limited to the above exemplary embodiments, but various modifications can be made thereto within the scope of the invention and should be construed as falling within the scope of the invention.

A program for performing the signal selecting method according to the present invention may be recorded in a recording medium which can be read by a computer.

This application is based upon and claims the benefit of priority from Japanese Patent Application No. 2006-268142 filed on Sep. 29, 2006, the content of which is incorporated by reference.

The invention claimed is:

1. A signal selecting apparatus for determining an operation parameter of a circuit, comprising:
   a circuit analyzing unit for enumerating signals in said circuit that are to be measured for said operation parameter when information of said circuit is input thereto;
   an observation signal number determination unit for statistically determining a number of observation signals required to determine said operation parameter from a width and a reliability of an estimated error and from a number of said enumerated signals; and
   an observation signal selecting unit for selecting, from said enumerated signals, the same number of signals as the number of said observation signals.

2. The signal selecting apparatus according to claim 1, wherein said operation parameter comprises a toggle percentage or a power consumption rate; and
   said observation signal number determination unit determines the number of said observation signals on an assumption that a probability distribution of said operation parameter is a normal distribution.

3. The signal selecting apparatus according to claim 2, wherein said observation signal number determination unit determines the number of said observation signals in order to statistically guarantee a value of said toggle percentage when said toggle percentage is of a predetermined value or greater.

4. The signal selecting apparatus according to claim 1, wherein said observation signal selecting unit selects, in advance, signals other than those signals that are recognized as unchanged.

5. The signal selecting apparatus according to claim 1, wherein said observation signal selecting unit selects, in advance, signals other than those signals that are recognized as changed.

6. The signal selecting apparatus according to claim 1, wherein said circuit analyzing unit analyzes a dependency relationship between said enumerated signals; and
   said observation signal selecting unit selects signals with no dependency relationship therebetween from said selected signals.

7. The signal selecting apparatus according to claim 1, wherein said circuit comprises a plurality of subblocks;
   said circuit analyzing unit enumerates signals in each designated subblock;
   said observation signal number determination unit statistically determines a number of observation signals in said each designated subblock from said width and said reliability of said estimated error and from a number of said enumerated signals in said each designated subblock; and
   said observation signal selecting unit selects the same number of signals as the number of said observation signals in said each designated subblock from said enumerated signals in said each designated subblock.

8. The signal selecting apparatus according to claim 7, wherein said observation signal number determination unit statistically determines the number of said observation signals in said each designated subblock from said width and said reliability of said estimated error and from the number of said enumerated signals in said each designated subblock, and determines a number produced by subtracting a number of observation signals in one or more designated subblocks included in said each designated subblock from a determined number of observation signals, as the number of said observation signals in said each designated subblock.

9. A circuit correcting apparatus comprising:
   a circuit inserting unit for inserting, into said circuit, change detecting circuits for detecting changes in observation signals selected by the signal selecting apparatus according to claim 1, and a reading circuit for reading said changes detected by said change detecting circuits.

10. The circuit correcting apparatus according to claim 9, wherein said change detecting circuits detect a number of times that said observation signals have changed, and said reading circuit reads a number of times that said observation signals have changed.

11. The circuit correcting apparatus according to claim 9, wherein said change detecting circuits comprise means for determining whether or not changes in said observation signals are to be detected.

12. A circuit simulator comprising:
   a detecting unit for detecting changes in observation signals selected by the signal selecting apparatus according to claim 1; and
   an estimating unit for estimating an overall toggle percentage of said circuit from said detected changes.

13. The circuit simulator according to claim 12, wherein said detecting unit counts a number of time that said observation signals have changed, and said estimating unit estimates an overall power consumption rate of said circuit from said number of time.

14. A circuit emulator comprising:
   an emulator unit for emulating a circuit corrected by the circuit correcting apparatus according to claim 9; and
   an estimating unit for reading a number of changed observation signals from said reading circuit and estimating an overall toggle percentage of said circuit from the number of changed observation signals.

15. A circuit emulator comprising:
an emulator unit for emulating a circuit corrected by the circuit correcting apparatus according to claim 10; and
an estimating unit for estimating an overall power consumption rate of said circuit from the number of times that said observation signals have changed.

16. A signal selecting method to be carried out by an information processing apparatus for determining an operation parameter of a circuit, comprising:
a circuit analyzing step of enumerating signals in said circuit that are to be measured for said operation parameter when information of said circuit is input;
a signal number determining step for statistically determining a number of observation signals required to determine said operation parameter from a width and a reliability of an estimated error and from a number of said enumerated signals; and
a signal selecting step of selecting, from said enumerated signals, the same number of signals as the number of said observation signals.

17. The signal selecting method according to claim 16, wherein said operation parameter comprises a toggle percentage or a power consumption rate; and
said signal number determining step determines the number of said observation signals on an assumption that a probability distribution of said operation parameter is a normal distribution.

18. The signal selecting method according to claim 17, wherein said signal number determining step determines the number of said observation signals in order to statistically guarantee a value of said toggle percentage when said toggle percentage is of a predetermined value or greater.

19. The signal selecting method according to claim 16, wherein said signal selecting step selects, in advance, signals other than those signals that are recognized as unchanged.

20. The signal selecting method according to claim 16, wherein said signal selecting step selects, in advance, signals other than those signals that are recognized as changed.

21. The signal selecting method according to claim 16, wherein said circuit analyzing step analyzes a dependency relationship between said enumerated signals; and
said signal selecting step selects signals with no dependency relationship therebetween from said selected signals.

22. The signal selecting method according to claim 16, wherein said circuit comprises a plurality of subblocks;
said circuit analyzing step enumerates signals in each designated subblock;
said signal number determining step statistically determines a number of observation signals in said each designated subblock from said width and said reliability of said estimated error and from a number of said enumerated signals in said each designated subblock; and
said signal selecting step selects the same number of signals as the number of said observation signals in said each designated subblock from said enumerated signals in said each designated subblock.

23. The signal selecting method according to claim 22, wherein said signal number determining step statistically determines the number of said observation signals in said each designated subblock from said width and said reliability of said estimated error and from the number of said enumerated signals in said each designated subblock, and determines a number produced by subtracting a number of observation signals in one or more designated subblocks included in said each designated subblock from a determined number of observation signals, as the number of said observation signals in said each designated subblock.

24. A program product for enabling a computer to select signals for determining an operation parameter of a circuit, comprising:
a circuit analyzing process for enumerating signals in said circuit that are to be measured for said operation parameter when information of said circuit is input;
a signal number determining process for statistically determining a number of observation signals required to determine said operation parameter from a width and a reliability of an estimated error and from a number of said enumerated signals; and
a signal selecting process for selecting, from said enumerated signals, the same number of signals as the number of said observation signals.

25. The program product according to claim 24, wherein said operation parameter comprises a toggle percentage or a power consumption rate; and
said signal number determining process determines the number of said observation signals on an assumption that a probability distribution of said operation parameter is a normal distribution.

26. The program product according to claim 25, wherein said signal number determining process determines the number of said observation signals in order to statistically guarantee a value of said toggle percentage when said toggle percentage is of a predetermined value or greater.

27. The program product according to claim 24, wherein said signal selecting process selects, in advance, signals other than those signals that are recognized as unchanged.

28. The program product according to claim 24, wherein said signal selecting process selects, in advance, signals other than those signals that are recognized as changed.

29. The program product according to claim 24, wherein said circuit analyzing process analyzes a dependency relationship between said enumerated signals; and
said signal selecting process selects signals with no dependency relationship therebetween from said selected signals.

30. The program product according to claim 24, wherein said circuit comprises a plurality of subblocks;
said circuit analyzing process enumerates signals in each designated subblock;
said signal number determining process statistically determines a number of observation signals in said each designated subblock from said width and said reliability of said estimated error and from a number of said enumerated signals in said each designated subblock; and
said signal selecting process selects the same number of signals as the number of said observation signals in said each designated subblock from said enumerated signals in said each designated subblock.

31. The program product according to claim 30, wherein said signal number determining process statistically determines the number of said observation signals in said each designated subblock from said width and said reliability of said estimated error and from the number of said enumerated signals in said each designated subblock, and determines a number produced by subtracting a number of observation signals in one or more designated subblocks included in said each designated subblock from a determined number of observation signals, as the number of said observation signals in said each designated subblock.

* * * * *